United States Patent [19]

Beachy

[11] Patent Number: 5,502,807
[45] Date of Patent: Mar. 26, 1996

[54] CONFIGURABLE VIDEO SEQUENCE VIEWING AND RECORDING SYSTEM

[75] Inventor: Jeffrey L. Beachy, Wilsonville, Oreg.

[73] Assignee: Tektronix, Inc., Wilsonville, Oreg.

[21] Appl. No.: 947,620

[22] Filed: Sep. 21, 1992

[51] Int. Cl.$^6$ ................................................ G06T 13/00
[52] U.S. Cl. ............................................................... 395/152
[58] Field of Search .................................. 395/128, 139, 395/152, 164, 165; 345/122; 348/715

[56] References Cited

U.S. PATENT DOCUMENTS

| Re. 33,316 | 8/1990 | Katsuta et al. | 395/128 |
|---|---|---|---|
| 4,454,593 | 6/1984 | Fleming et al. | 395/128 |
| 4,649,380 | 3/1987 | Penna | 340/721 |
| 4,688,095 | 8/1987 | Beg et al. | 358/160 |
| 4,703,356 | 10/1987 | Herzog et al. | 358/160 |
| 4,703,439 | 10/1987 | Lutz | 395/128 |
| 4,751,507 | 6/1988 | Hama et al. | 340/721 |
| 4,774,582 | 9/1988 | Hakamada et al. | 358/183 |
| 4,808,987 | 2/1989 | Takeda et al. | 340/721 |
| 4,868,764 | 9/1989 | Richards | 395/125 |
| 4,870,479 | 9/1989 | Dubner | 358/18 |
| 4,980,765 | 12/1990 | Kudo et al. | 358/160 |
| 5,018,014 | 5/1991 | Hashimoto | 358/183 |
| 5,021,977 | 6/1991 | Sakaguchi | 395/164 |
| 5,025,394 | 6/1991 | Parke | 395/152 |
| 5,047,857 | 9/1991 | Duffiekl et al. | 358/183 |
| 5,068,805 | 11/1991 | Tsuzuki | 395/164 |
| 5,093,907 | 3/1992 | Hwong et al. | 395/152 |
| 5,109,438 | 4/1992 | Alves et al. | 358/433 |
| 5,119,081 | 6/1992 | Ikehira | 395/128 |
| 5,319,460 | 6/1994 | Kubo | 348/715 |

FOREIGN PATENT DOCUMENTS 55-34706  3/1980  Japan .

*Primary Examiner*—Heather R. Herndon
*Assistant Examiner*—Anton Fetting
*Attorney, Agent, or Firm*—Francis I. Gray

[57] ABSTRACT

A configurable video sequence viewing and recording system stores multiple computer generated images of a sequence in a frame buffer and plays back the images for animation motion study. The images are stored either in a full size format or in a decimated format according to a decimation factor. The images are read out in real time for display from the frame buffer, with pixels/lines/frames being replicated to provide full size images for a desired number of frames each. The number of images of a sequence to be displayed/stored are determined by an operator, and a loop function is provided so that the sequence may be continuously displayed.

5 Claims, 5 Drawing Sheets 5,502,807

CONFIGURABLE VIDEO SEQUENCE VIEWING AND RECORDING SYSTEM

BACKGROUND OF THE INVENTION

The present invention relates to computer generated graphics systems, and more particularly to a configurable video sequence viewing and recording system that provides the ability to view video sequences, regardless of the size at which the image is rendered, in full size and in realtime on a video monitor.

In computer generated graphics systems an operator renders a sequence of images to create an animation sequence. When the operator completes the sequence, he/she performs a motion study to verify the sequence. The operator may perform the motion study by stepping through the sequence on the computer display. However it is preferable to convert the sequence to a video sequence and view it on a video monitor. The video memory generally is limited to a four frame buffer, i.e., only four frames of video may be viewed at one time. Since one frame of video is displayed in 1/30th of a second, this allows only a very small portion of the sequence to be displayed and run for motion study at a time. Since animation sequences may be 15–30 seconds in duration, motion studies become a very time consuming process.

What is desired is a video viewing and recording system that allows an operator to conduct a motion study on animation sequences that significantly reduces the amount of time required to complete the study.

SUMMARY OF THE INVENTION

Accordingly the present invention provides a configurable video sequence viewing and storing system that provides the ability to view video sequences in full size and in realtime on a video monitor. An animation sequence is generated on a computer workstation by an operator and then stored in a frame buffer under control of a video timing and frame buffer controller. The animation sequence may be decimated under control of the operator as it is input to the frame buffer so that, for example, a four frame buffer memory may contain up to sixty-four image frames of the sequence. The effective length of the sequence further may be extended by decreasing the viewing rate to less than thirty frames per second. Frames may further be decimated in the vertical dimension and displayed as fields to double the effective sequence length. Programmable logic arrays are used to implement the controllers so that appropriate sub-sets of the features may be provided with reduced hardware since all features need not be required at once.

The objects, advantages and novel features of the present invention are apparent from the following detailed description when read in light of the appended claims and attached drawing.

DESCRIPTION OF THE PREFERRED EMBODIMENT

Figure 1:
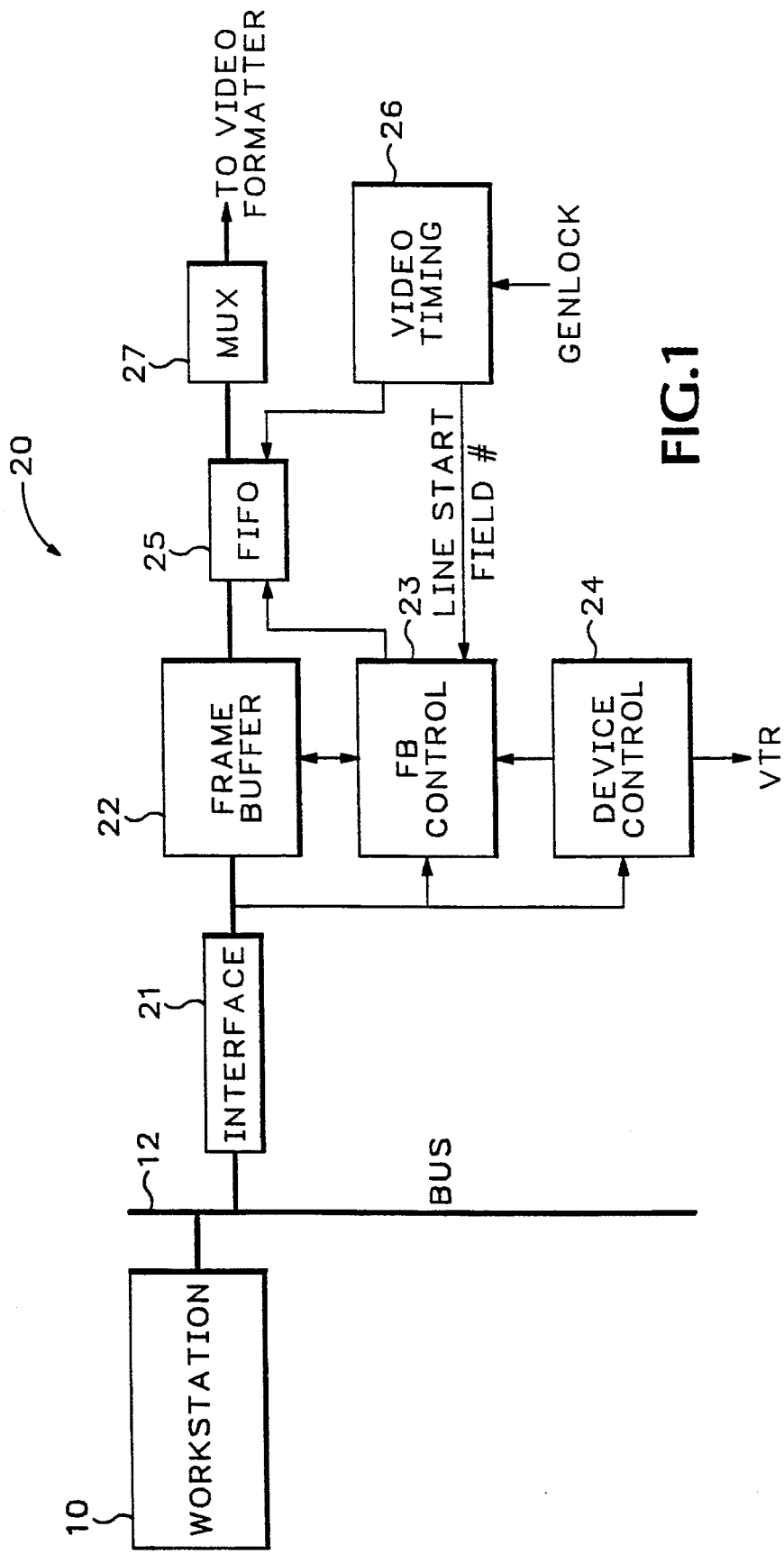
FIG. 1 is a block diagram of a configurable video sequence viewing and recording system according to the present invention.

Referring now to FIG. 1 a computer graphics workstation 10, having a central processing unit, memory and mass storage, is coupled to a computer bus 12, such as a VMEbus. Also coupled to the VMEbus 12 is a video systems module 20, such as the AVANZAR Video Systems card manufactured by Tektronix, Inc. of Wilsonville, Oreg., United States of America. A bus interface circuit 21 couples the video systems card 20 to the VMEbus 12. A frame buffer 22 receives data from the workstation 10 and stores it under control of a frame buffer controller 23. The frame buffer controller 23 receives commands from the workstation 10 to store and readout data to and from the frame buffer 22 according to a feature selected by an operator at the workstation. Commands from the workstation 10 also are received by a device controller 24 that controls external video storage devices, such as video tape recorders (VTR). The device controller 24 also provides information to the frame buffer controller 23. Data from the frame buffer 22 is input to a buffer register 25, such as a first-in, first-out (FIFO) buffer, under control of the frame buffer controller 23. The video timing circuit 26 generates all necessary timing signals from a genlock input clock signal to read the data from the buffer register 25. The video timing circuit 26 provides line start and field number data to the frame buffer controller 23. The output of the buffer register 25 is coupled to a register/multiplexer 27 which outputs the digital data for subsequent conversion into a desired video format for display on a video monitor and/or recording on an appropriate video storage device.

Figure 2:
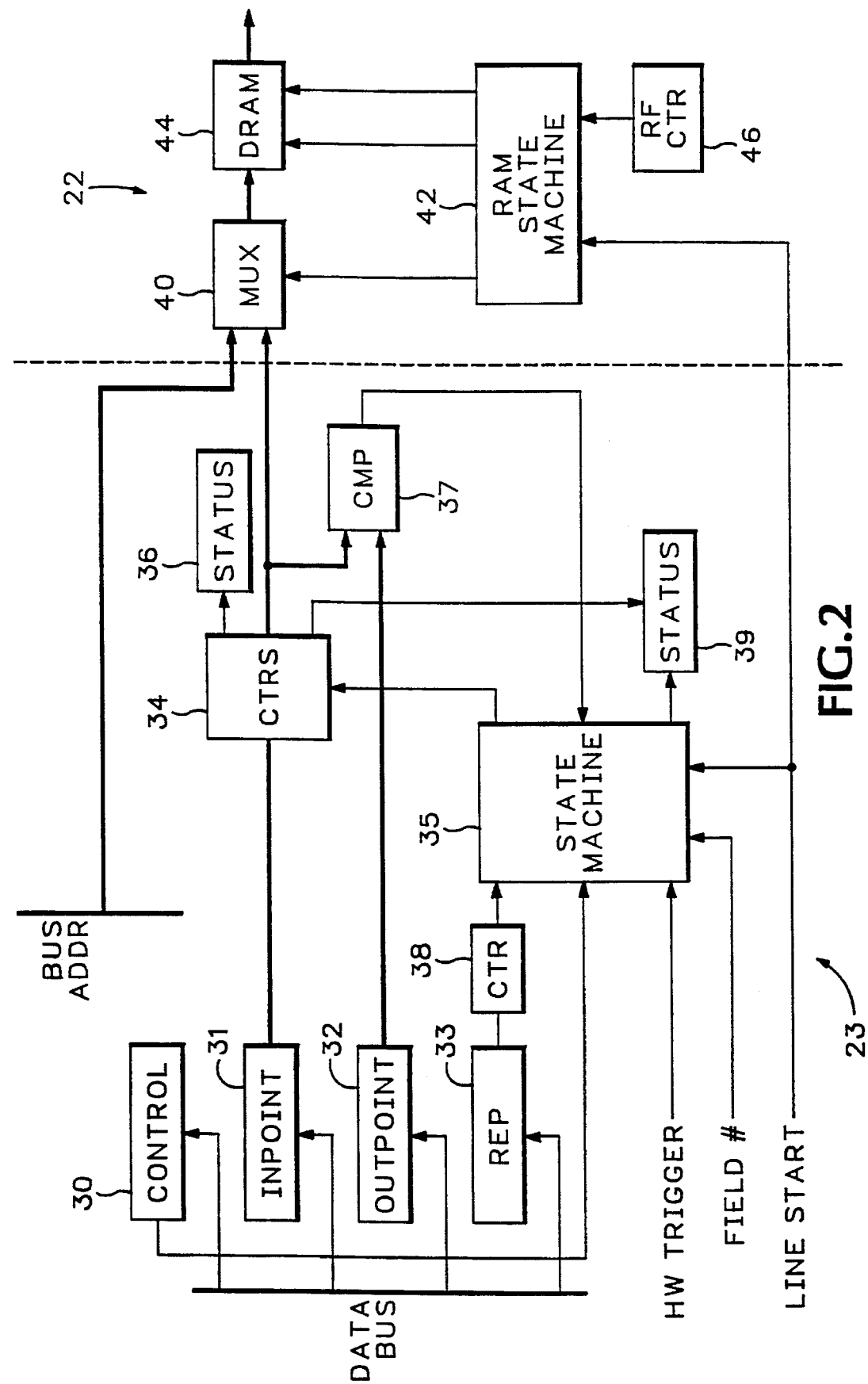
FIG. 2 is a block diagram of a programmable logic array configured to implement the configurable video sequence viewing and recording system according to the present invention.

The frame buffer controller 23 is shown in greater detail in FIG. 2. A plurality of registers 30–33 store data values from the workstation 10 via the VMEbus 12. The registers include a CONTROL register 30, an INPOINT register 31, an OUTPOINT register 32 and a REP register 33. The output of the CONTROL register 30 is input to a state machine 35. Also input to the state machine 35 is an external hardware trigger, and the line start and field number data from the video timing circuit 26. The data from the INPOINT register 31 is input to video counters 34. The output of the video counters 34 is input to a comparator 37 together with the data from the OUTPOINT register 32. The output of the comparator 37 is input to the state machine 35. The output of the REP register 33 is input to a repetition counter 38, the output of which also is input to the state machine 35. A status register 36 is coupled to the video counters 34, and another status register 39 is coupled to both the video counters and the state machine 35.

The output from the video counters 34 is input to an address multiplexer 40 of the frame buffer 22 together with an address from the VMEbus 12. A memory state machine 42 selects which address the multiplexer 40 passes on to a memory 44, such as a DRAM, that stores the data from the workstation 10 representing image files of the sequence to be displayed. Also input to the memory state machine 42 is the line start data from the video timing circuit 26 via the frame buffer controller 23 and an input from a refresh counter 46. The memory state machine 42 controls the DRAM 44.

Figure 3:
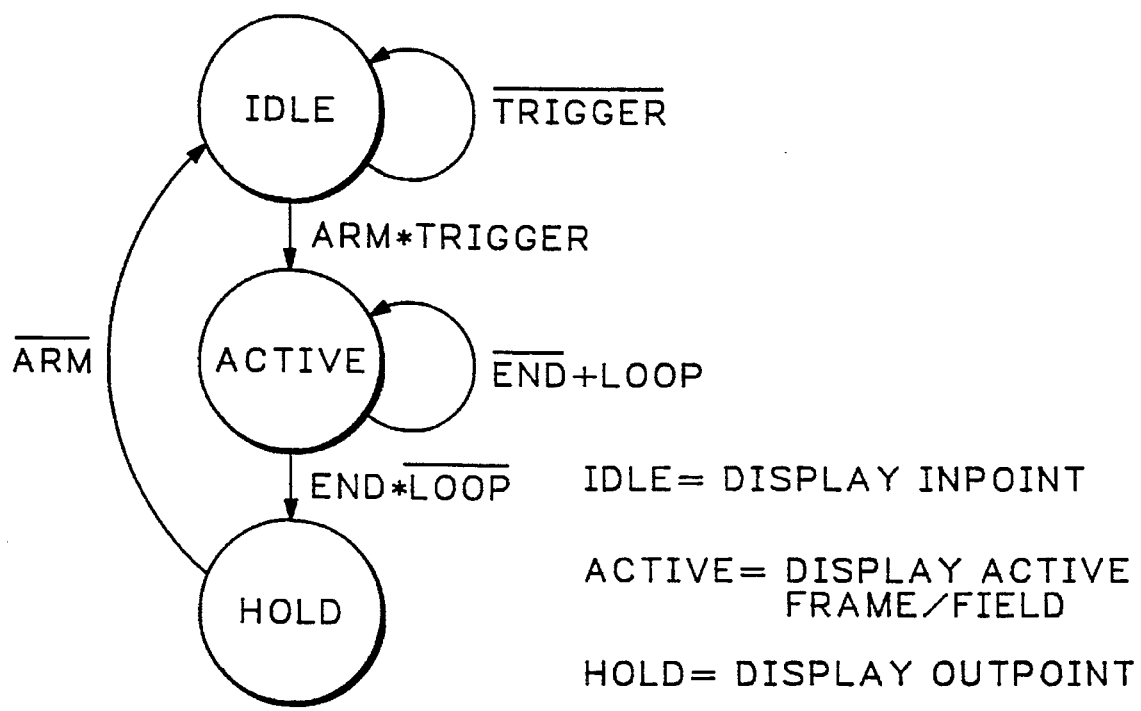
FIG. 3 is a state diagram for a state machine in the programmable logic array of FIG. 2.

The display process for the frame buffer controller state machine 23 is represented by the state diagram of FIG. 3. The state machine has three states: IDLE, ACTIVE and HOLD. In the IDLE state the INPOINT is displayed, i.e., the first image of the sequence appears on the video monitor. So long as an ARM signal and a TRIGGER signal are absent, the state machine remains in the IDLE state. The ARM signal acts as an enable signal, and the TRIGGER signal acts as a start signal. When the ARM and TRIGGER signals are present, the state machine transitions to the ACTIVE state and displays the currently active frame or field, depending upon the mode of operation, which changes as the state machine controls the readout of the images of the sequence from the frame buffer 22. The state machine remains in the ACTIVE state so long as there is no END signal or there is a LOOP signal. The END signal acts as a stop signal, and the LOOP signal acts as a continuous activation, or loop, signal. When the END signal occurs and there is no LOOP signal, the state machine transitions to the HOLD state. In the HOLD state the OUTPOINT image of the sequence is displayed on the video monitor.

Figure 4:
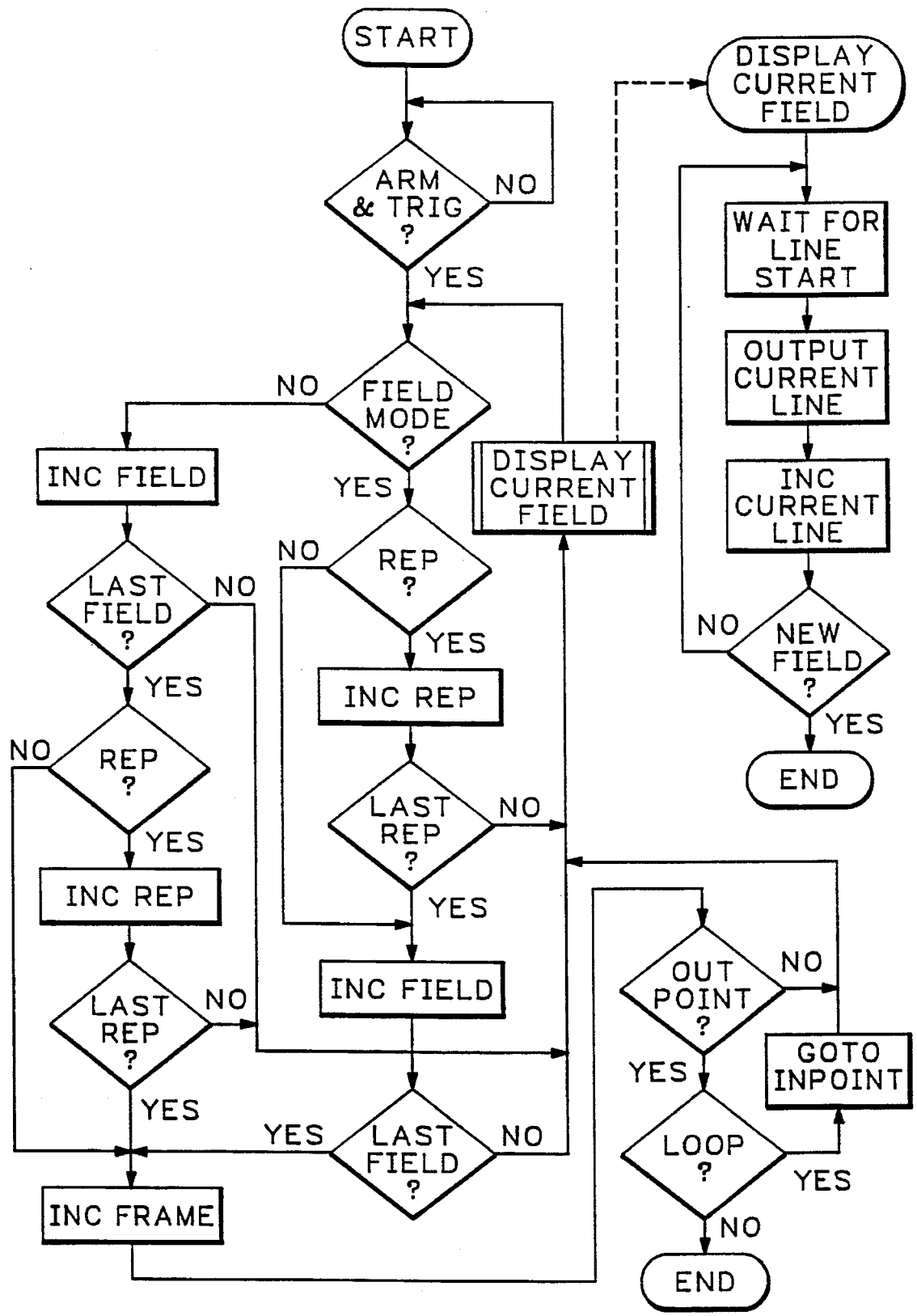
FIG. 4 is a flow chart for the display output of the configurable video sequence viewing and recording system according to the present invention.

This process is described in further detail by the flowchart of FIG. 4. The first test is whether both the ARM and TRIGGER signals are present. If the answer is NO, no further action occurs. If the answer is YES, then the mode is tested for FIELD or FRAME mode. If in the FRAME mode, the FIELD number is incremented and tested to determine whether it is the last field of a frame. If NO, then the current field is displayed. If YES, then the REP register is tested to determine whether the frame is to be repeated. If YES, then the REP count is incremented and tested to determine whether it is the last repetition. If NO, then the current field is displayed again. If YES or if no repetition is indicated, then the frame is incremented. If in the FIELD mode the repetition loop is accessed as described above. If there are no repetitions, then the field is incremented and tested. If NO, then the current field is displayed, otherwise if YES, the frame is incremented.

Since each frame represents an image of the sequence stored in the frame buffer 22, after the frame is incremented OUTPOINT is tested to determine whether the last image of the sequence is indicated. If NO, then the current field is displayed. If YES, then a test is made of LOOP. If at OUTPOINT and not in LOOP, then the HOLD state is entered and the last image of the sequence is displayed. If in LOOP, then the process returns to the INPOINT image and displays the current field. Once the current field is displayed, the process returns to the FIELD/FRAME test step and repeats the process.

The step of displaying the current field waits until a LINE START signal from the video timing circuit 26 occurs. Then the current line is output and incremented. The field number data from the video timing circuit 26 is then tested to determine whether a new field is indicated. If NO, then the next line is output when the next LINE START signal occurs. Otherwise the step exits from the display process and returns to the FIELD/FRAME mode test step.

Figure 5:
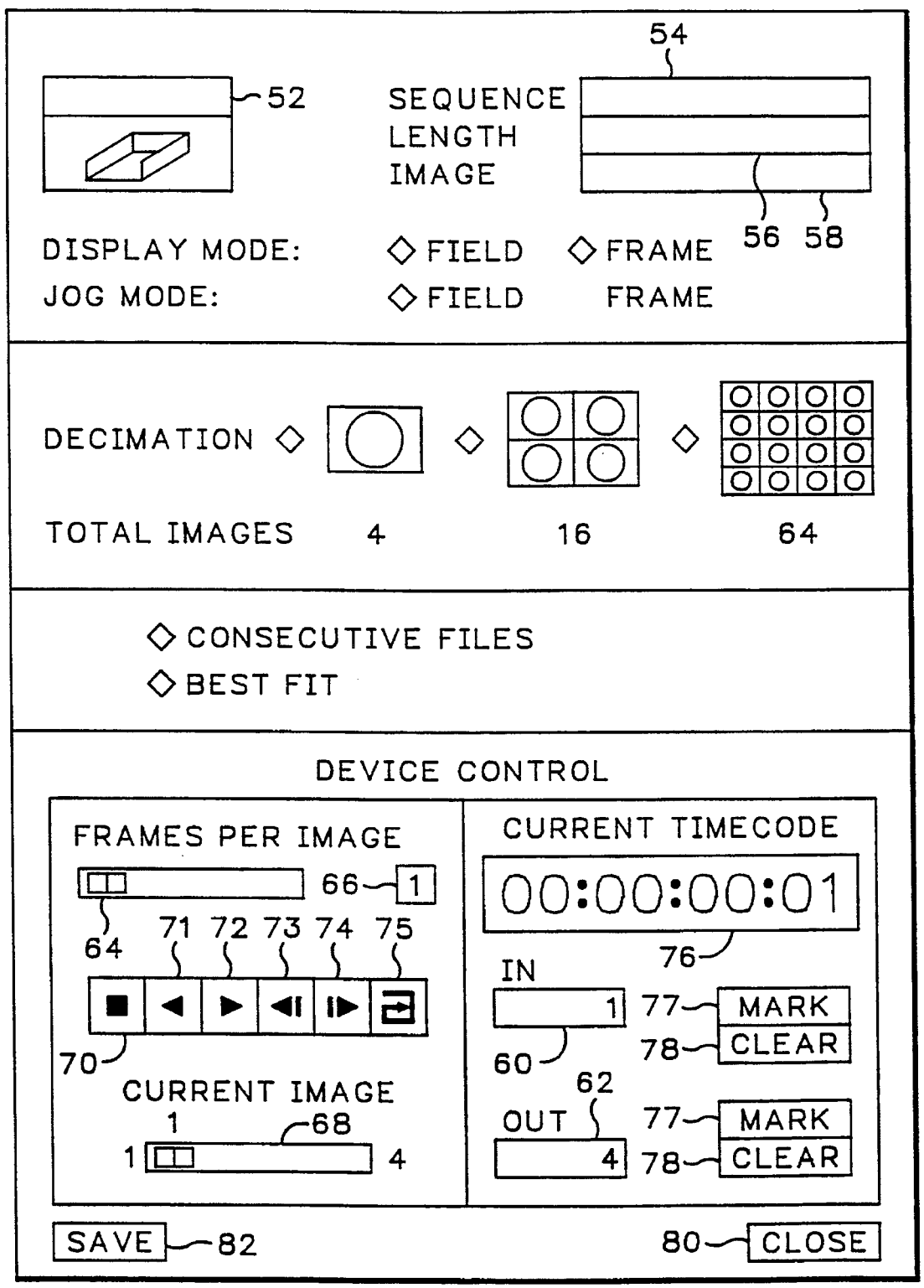
FIG. 5 is a plan view of a control panel for a configurable video sequence viewing and recording system according to the present invention.

Referring now to FIG. 5 in operation when this system is accessed an interface panel 50 is displayed at the workstation 10. When a sequence is selected, a file folder or other indicia appears in the basket 52 and the sequence name appears in an appropriate window 54. The length of the sequence (in images) appears in another window 56, and a file name for the current image, which is also displayed on the video monitor, appears in yet another window 58. A LOAD button (not shown) appears. The display mode, FIELD or FRAME, as well as the jog mode, is then selected. Finally the decimation factor is selected. In this particular embodiment either four (no decimation), sixteen (decimation by four) or sixty-four (decimation by sixteen) frames are selected, and that number of image files is transferred as pixel data into the frame buffer. For decimation by four, every other pixel on every other line is stored for each image. For decimation by sixteen, every fourth pixel from every fourth line is stored for each image. The operator may specify that consecutive files of the sequence are to be viewed, indicating either the first image number at which viewing is to begin in an IN box 60 or the last image number at which viewing is to stop in an OUT box 62. Alternatively the operator may specify that a best fit of the sequence be determined and used when all of the image files won't fit into the frame buffer 22, i.e., there are more than sixty-four image files. When the LOAD button is activated, the images from the workstation 10 are transferred for storage into the frame buffer 22 according to the selected decimation factor.

A device control section of the interface panel 50 includes a frames per image slider 64 that allows the operator to vary the number of times each image frame is consecutively displayed during playback. The slider scale indicates a first range, such as 1–10, but a data entry box 66 allows entry of numbers above the first range up to a predetermined maximum, such as thirty-two. Also included are device control buttons 70–75 for providing the following functions: stop, play forward, play reverse, jog forward, jog reverse and loop respectively. A current image slider 68 is used to select the current image file to be displayed. Also a timecode window 76 indicates the timecode of the current image in terms of hours, minutes, seconds and frames. The data in the IN and OUT boxes 62, 64 are controlled by respective MARK/CLEAR buttons 77, 78. Finally a CLOSE button 80 acts to stop the process and close the panel, while a SAVE button 82 opens another panel so that the decimated sequence may be saved.

Thus the present invention provides a configurable video sequence viewing and recording system that allows an operator to motion check an animation sequence by decimating the image files for storage in a frame buffer and repeating frames when playing the sequence from the frame buffer.

What is claimed is:

1. A method of viewing and recording an animation sequence of graphic images comprising the steps of:

storing a specified number of graphic images of the animation sequence in a frame buffer according to a selected decimation factor; and reading out from the frame buffer selected ones of the graphic images in sequence to provide a full size, real time display of the animation sequence represented by the selected graphic images on a display monitor.

2. A method as recited in claim 1 further comprising the step of specifying a first and a last graphic image of the animation sequence for storing and reading out.

3. A method as recited in claim 1 wherein the storing step comprises the steps of:

dividing the frame buffer into k image regions, where k is the number of graphic images of the animation sequence that are to be stored in the frame buffer according to the selected decimation factor; and for each graphic image transferring every $2^n$th pixel of every $2^n$th line of the graphic image of the animation sequence to the corresponding image region of the frame buffer, where n is the selected decimation factor.

4. A method as recited in claim 3 wherein the reading out step comprises the steps of:

for each graphic image reading out each pixel from the frame buffer $2^n$ times, and repeating each line $2^n$ times, for each graphic image in real time to produce a full size image for display; and repeating the reading out step for each graphic image in the animation sequence to be displayed.

5. A method as recited in claim 1 wherein the storing step comprises the steps of:

determining a best fit for the graphic images of the animation sequence to be stored when the number of graphic images in the animation sequence exceeds the capacity of the frame buffer at the selected decimation factor; and storing the graphic images satisfying the best fit in sequence in the frame buffer.

\* \* \* \* \*